(12) United States Patent  
Basnayake et al.

(10) Patent No.: US 9,127,952 B2  
(45) Date of Patent: Sep. 8, 2015

(54) ESTIMATION OF VEHICLE LOCATION

(75) Inventors: Chaminda Basnayake, Windsor (CA); Eray Yasan, Canton, MI (US); Curtis L. Hay, Clarkston, MI (US); Debo Sun, Windsor (CA)

(73) Assignee: GENERAL MOTORS LLC, Detroit, MI (US)

( * ) Notice: Subject to any disclaimer, the term of this patent is extended or adjusted under 35 U.S.C. 154(b) by 299 days.

(21) Appl. No.: 13/364,137

(22) Filed: Feb. 1, 2012

(65) Prior Publication Data

US 2013/0197795 A1     Aug. 1, 2013

(51) Int. Cl.  
*G01C 21/30* (2006.01)  
*G01C 21/16* (2006.01)

(52) U.S. Cl.  
CPC .............. *G01C 21/30* (2013.01); *G01C 21/165* (2013.01)

(58) Field of Classification Search  
CPC ...... G01C 21/30; G01C 21/32; G01C 21/005; G01C 21/10; G01C 21/12; G01C 21/14; G01C 21/16; G01C 21/165; G01C 21/26; G01C 21/28; G01C 21/34; G01C 21/3446; G01C 21/3492  
USPC .......................................................... 701/412  
See application file for complete search history.

*Primary Examiner* — John Q Nguyen  
*Assistant Examiner* — Kyung Kim  
(74) *Attorney, Agent, or Firm* — Leydig, Voit & Mayer, Ltd.

(57) ABSTRACT

A method for estimating the position of a telematics-equipped vehicle during navigation includes: receiving a partial map corresponding to a route; receiving Global Positioning System (GPS) data corresponding to a current position of the vehicle; performing a closest street (CS) mapping based on the GPS data and the partial map so as to provide an estimation for a vehicle position on a street of the partial map; performing speed sum (SS) mapping based on the estimated vehicle position and speed readings corresponding to vehicle speed so as to provide an estimation of distance traveled with reference to a previous vehicle position; and presenting a map matched vehicle position to a user based on the CS mapping and the SS mapping.

12 Claims, 5 Drawing Sheets

ESTIMATION OF VEHICLE LOCATION

The present disclosure relates generally to navigation systems and more specifically to estimating a vehicle location based on a partial map.

BACKGROUND

Telematics units within mobile vehicles provide subscribers with connectivity to a telematics service provider (TSP). The TSP provides subscribers with an array of services ranging from emergency call handling and stolen vehicle recovery to diagnostics monitoring and turn-by-turn navigation. Telematics units are often provisioned and activated at a point of sale when a subscriber purchases a telematics-equipped vehicle. Upon activation, the telematics unit can be utilized to provide a subscriber with the telematics services.

One of the services conventionally provided by TSPs is Global Positioning System (GPS) navigation, which may include the provision of Turn-by-Turn (TBT) directions. To use GPS navigation, a user of the telematics unit may enter a destination, and the GPS component of the telematics unit may provide directions (e.g. through a display and/or through vocal instructions) to the user based on a calculated course from the user's current location to the user's destination. When a user does not follow the directions and goes off-course (i.e., when the position of the vehicle is not on the calculated course), the GPS unit may recalculate a new course for the user to take based on the vehicle's position when it goes off-course. The position of the telematics unit is determined through reception of GPS signals or a combination of GPS signals and dead reckoning (DR).

In many circumstances, such as in urban canyon environments, the GPS signal received by a telematics unit may not accurately indicate the vehicle's actual position. Thus, the user may be provided with incorrect information as to the user's present location. Furthermore, the user may be notified that the vehicle has gone off-course when it is in actuality following the directions originally provided to the telematics unit.

The inventors have created the above body of information merely for the convenience of the reader; the foregoing is a discussion of problems discovered and/or appreciated by the inventors, and is not an attempt to review or catalog the prior art.

BRIEF SUMMARY

The present invention provides a method for estimating the position of a telematics-equipped vehicle during navigation. In an implementation, the method includes: receiving a partial map corresponding to a route; receiving Global Positioning System (GPS) data corresponding to a current position of the vehicle; performing a closest street (CS) mapping based on the GPS data and the partial map so as to provide an estimation for a vehicle position on a street of the partial map; performing speed sum (SS) mapping based on the estimated vehicle position and speed readings corresponding to vehicle speed so as to provide an estimation of distance traveled with reference to a previous vehicle position; and presenting a map matched vehicle position to a user based on the CS mapping and the SS mapping.

In a further implementation, the present invention is implemented as computer-executable instructions stored on a tangible, non-transitory computer-readable medium that is part of a telematics unit.

BRIEF DESCRIPTION OF THE SEVERAL VIEWS OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION

Before discussing the details of the invention and the environment wherein the invention may be used, a brief overview is given to guide the reader. In general terms, not intended to limit the claims, the invention is directed to a system and method for estimating vehicle location using a partial map and vehicle sensors. It will be appreciated that the principles described herein are not limited to vehicles, but are applicable to any apparatus having an appropriate positioning system, for example, a Global Navigation Satellite System (GNSS) receiver (such as a GPS receiver) and one or more sensors (such as accelerometers and gyroscopes).

Figure 1:
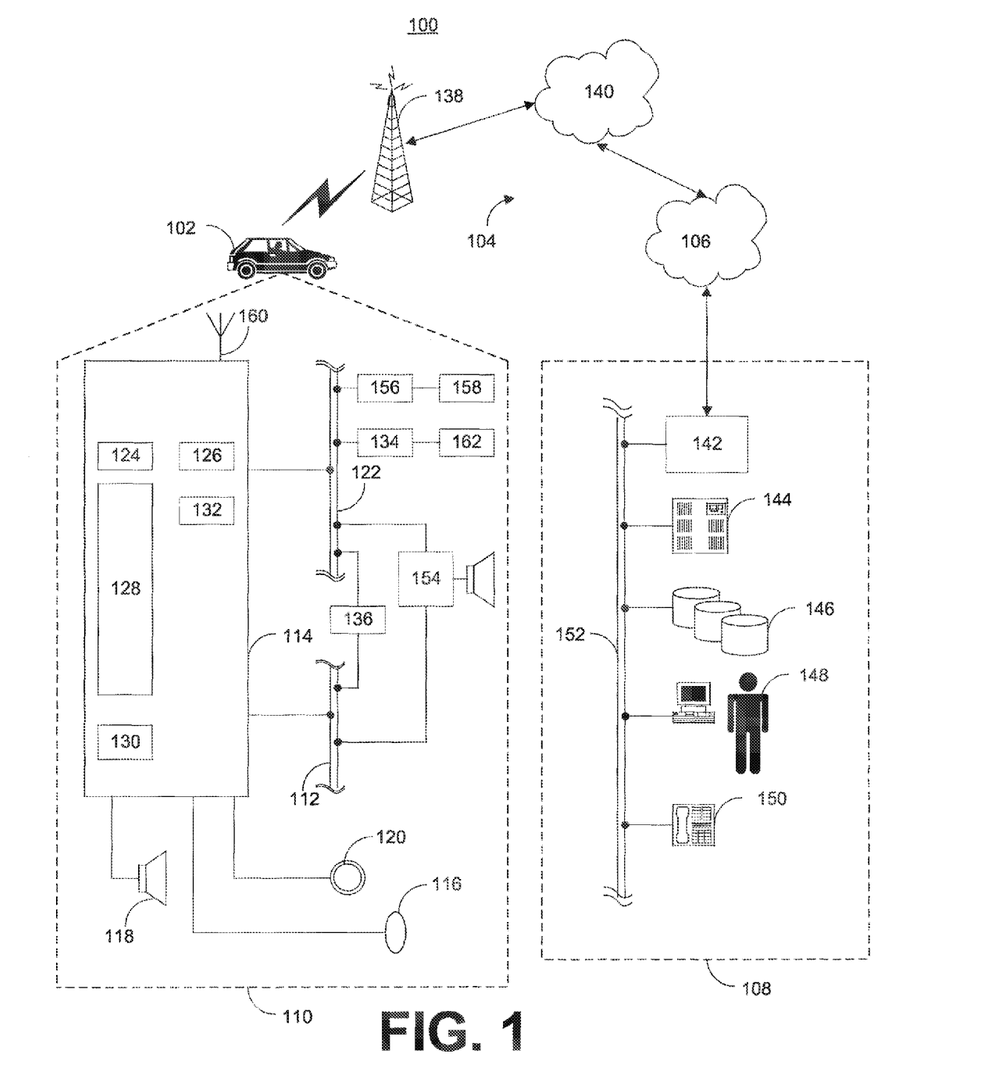
FIG. 1 is a schematic diagram of an operating environment for a mobile vehicle communication system usable in implementations of the described principles.

Given this overview, an exemplary environment in which the invention may operate is described hereinafter. It will be appreciated that the described environment is an example, and does not imply any limitation regarding the use of other environments to practice the invention. With reference to FIG. 1 there is shown an example of a communication system 100 that may be used with the present method and system and generally includes a vehicle 102, a wireless carrier system 104, a land network 106 and a call center 108. It should be appreciated that the overall architecture, setup and operation, as well as the individual components of a system such as that shown here are generally known in the art. Thus, the following paragraphs simply provide a brief overview of one such exemplary information system 100; however, other systems not shown here could employ the present method as well.

Vehicle 102 is preferably a mobile vehicle such as a motorcycle, car, truck, recreational vehicle (RV), boat, plane, etc., and is equipped with suitable hardware and software that enables it to communicate over system 100. Some of the vehicle hardware 110 is shown generally in FIG. 1 including a telematics unit 114, a microphone 116, a speaker 118 and buttons and/or controls 120 connected to the telematics unit 114. Operatively coupled to the telematics unit 114 is a network connection or vehicle bus 122. Examples of suitable network connections include a controller area network (CAN), a media oriented system transfer (MOST), a local interconnection network (LIN), an Ethernet, and other appropriate connections such as those that conform with known ISO, SAE, and IEEE standards and specifications, to name a few.

The telematics unit 114 is an onboard device that provides a variety of services through its communication with the call center 108, and generally includes an electronic processing device 128 one or more types of electronic memory 130, a cellular chipset/component 124, a wireless modem 126, a dual antenna 160 and a navigation unit containing a GPS chipset/component 132. In one example, the wireless modem 126 is comprised of a computer program and/or set of software routines executing within processing device 128. The cellular chipset/component 124 and the wireless modem 126 may be called the network access device (NAD) of the telematics unit 114.

The telematics unit 114 provides too many services to list them all, but several examples include: turn-by-turn directions and other navigation-related services provided in conjunction with the GPS based chipset/component 132; airbag deployment notification and other emergency or roadside assistance-related services provided in connection with various crash and or collision sensor interface modules 156 and sensors 158 located throughout the vehicle.

GPS navigation services may be implemented based on the geographic position information of the vehicle provided by the GPS based chipset/component 132. A user of the telematics unit may enter a destination using inputs corresponding to the GPS component, and a route to a destination may be calculated based on the destination address and a current position of the vehicle determined at approximately the time of route calculation. Turn-by-turn (TBT) directions may further be provided on a display screen corresponding to the GPS component and/or through vocal directions provided through a vehicle audio component 154. It will be appreciated that the calculation-related processing may occur at the telematics unit or may occur at a call center 108.

Infotainment-related services where music, Web pages, movies, television programs, video games and/or other content is downloaded by an infotainment center 136 operatively connected to the telematics unit 114 via vehicle bus 122 and audio bus 112. In one example, downloaded content is stored for current or later playback.

Again, the above-listed services are by no means an exhaustive list of all the capabilities of telematics unit 114, as should be appreciated by those skilled in the art, but are simply an illustration of some of the services that the telematics unit 114 is capable of offering. It is anticipated that telematics unit 114 include a number of known components in addition to those listed above.

Vehicle communications use radio transmissions to establish a communications channel with wireless carrier system 104 so that both voice and data transmissions can be sent and received over the communications channel. Vehicle communications are enabled via the cellular chipset/component 124 for voice communications and a wireless modem 126 for data transmission.

In order to enable successful data transmission over the communications channel, wireless modem 126 applies some type of encoding or modulation to convert the digital data so that it can communicate through a vocoder or speech codec incorporated in the cellular chipset/component 124. Any suitable encoding or modulation technique that provides an acceptable data rate and bit error can be used with the present method. Dual mode antenna 160 services the GPS chipset/component and the cellular chipset/component.

Microphone 116 provides the driver or other vehicle occupant with a means for inputting verbal or other auditory commands, and can be equipped with an embedded voice processing unit utilizing a human/machine interface (HMI) technology known in the art. Conversely, speaker 118 provides verbal output to the vehicle occupants and can be either a stand-alone speaker specifically dedicated for use with the telematics unit 114 or can be part of a vehicle audio component 154. In either event, microphone 116 and speaker 118 enable vehicle hardware 110 and call center 108 to communicate with the occupants through audible speech.

The vehicle hardware also includes one or more buttons or controls 120 for enabling a vehicle occupant to activate or engage one or more of the vehicle hardware components 110. For example, one of the buttons 120 can be an electronic push button used to initiate voice communication with call center 108 (whether it be a live advisor 148 or an automated call response system). In another example, one of the buttons 120 can be used to initiate emergency services.

The audio component 154 is operatively connected to the vehicle bus 122 and the audio bus 112. The audio component 154 receives analog information, rendering it as sound, via the audio bus 112. Digital information is received via the vehicle bus 122. The audio component 154 provides AM and FM radio, CD, DVD, and multimedia functionality independent of the infotainment center 136. Audio component 154 may contain a speaker system, or may utilize speaker 118 via arbitration on vehicle bus 122 and/or audio bus 112.

The vehicle crash and/or collision detection sensor interface 156 are operatively connected to the vehicle bus 122. The crash sensors 158 provide information to the telematics unit 114 via the crash and/or collision detection sensor interface 156 regarding the severity of a vehicle collision, such as the angle of impact and the amount of force sustained.

Vehicle sensors 162, connected to various sensor interface modules 134 are operatively connected to the vehicle bus 122. Example vehicle sensors include but are not limited to gyroscopes, accelerometers, magnetometers, emission detection and/or control sensors, and the like. Example sensor interface modules 134 include powertrain control, climate control, and body control, to name but a few.

Wireless carrier system 104 is preferably a cellular telephone system or any other suitable wireless system that transmits signals between the vehicle hardware 110 and land network 106. According to an example, wireless carrier system 104 includes one or more cell towers 138, base stations and/or mobile switching centers (MSCs) 140, as well as any other networking components required to connect the wireless system 104 with land network 106. A component in the mobile switching center may include a remote data server.

As appreciated by those skilled in the art, various cell tower/base station/MSC arrangements are possible and could be used with wireless system 104 (also referred to as the "cellular network" herein). For example, a base station and a cell tower could be co-located at the same site or they could be remotely located, and a single base station could be coupled to various cell towers or various base stations could be coupled with a single MSC, to name but a few of the possible arrangements. Preferably, a speech codec or vocoder is incorporated in one or more of the base stations, but depending on the particular architecture of the wireless network, it could be incorporated within a Mobile Switching Center or some other network components as well.

Land network 106 can be a conventional land-based telecommunications network that is connected to one or more landline telephones and connects wireless carrier network 104 to call center 108. For example, land network 106 can include a public switched telephone network (PSTN) and/or an Internet protocol (IP) network, as is appreciated by those skilled in the art. Of course, one or more segments of the land network 106 can be implemented in the form of a standard wired network, a fiber or other optical network, a cable network, other wireless networks such as wireless local networks (WLANs) or networks providing broadband wireless access (BWA), or any combination thereof.

Call Center (OCC) 108 is designed to provide the vehicle hardware 110 with a number of different system back-end functions and, according to the example shown here, generally includes one or more switches 142, servers 144, databases 146, live advisors 148, as well as a variety of other telecommunication and computer equipment 150 that is known to those skilled in the art. These various call center components are preferably coupled to one another via a network connection or bus 152, such as the one previously described in connection with the vehicle hardware 110. Switch 142, which can be a private branch exchange (PBX) switch, routes incoming signals so that voice transmissions are usually sent to either the live advisor 148 or an automated response system, and data transmissions are passed on to a modem or other piece of equipment 150 for demodulation and further signal processing.

The modem 150 preferably includes an encoder, as previously explained, and can be connected to various devices such as a server 144 and database 146. For example, database 146 could be designed to store subscriber profile records, subscriber behavioral patterns, or any other pertinent subscriber information. Although the illustrated example has been described as it would be used in conjunction with a manned call center 108, it will be appreciated that the call center 108 can be any central or remote facility, manned or unmanned, mobile or fixed, to or from which it is desirable to exchange voice and data.

It will be appreciated by those of skill in the art that the execution of the various machine-implemented processes and steps described herein may occur via the computerized execution of computer-executable instructions stored on a tangible computer-readable medium, e.g., RAM, ROM, PROM, volatile, nonvolatile, or other electronic memory mechanism. Thus, for example, the operations performed by the telematics unit may be carried out according to stored instructions or applications installed on the telematics unit, and operations performed at the call center may be carried out according to stored instructions or applications installed at the call center.

Figure 2:
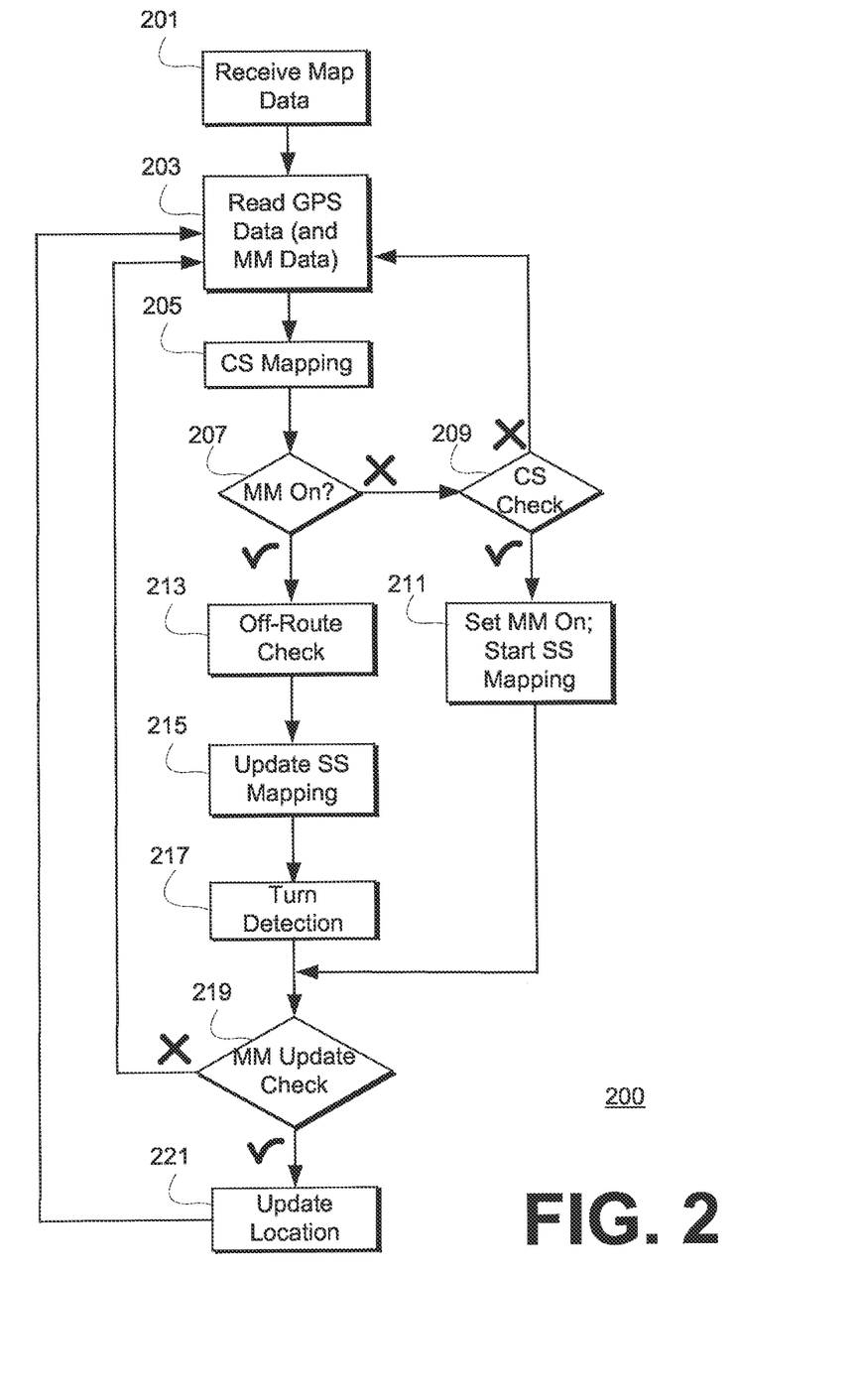
FIG. 2 is a flowchart illustrating a process for map matching in accordance with an implementation of the described principles.

With further reference to the architecture of FIG. 1, and turning more specifically to FIG. 2, a process 200 for map matching in an implementation of the present invention is depicted. In an implementation, the steps of the process 200 are performed by a map matching (MM) application running at the telematics unit (although it will be appreciated that, as a matter of design choice, steps of the process may be distributed to other entities such as the call center and not solely performed at the telematics unit).

The process 200 begins with receiving map data at a telematics unit at stage 201. This map data is a partial map including the street segments to be traveled from an origin to a destination (e.g., when a user requests TBT directions from a vehicle's current location to an intended destination). In an implementation, the map data is provided as a series of points with each point identifying a segment of a trip, and the collection of these segments constitutes the partial map. It will be appreciated that, although the implementations described herein utilize a partial map, the principles described herein may be applied to GPS navigation utilizing a complete map, for example, by treating a calculated route in a complete map in the manner that the partial map is utilized herein.

After a partial map is obtained at stage 201, GPS data is read at stage 203 to obtain a reported position data point (initially MM data will not be available, but at subsequent executions of stage 203 after map matching is turned on, the map is updated with MM position data). This GPS data can be GPS/DR data (position estimated by using a combination GPS and DR positioning system) or it can be GPS-only data. Using the reported position data point, a closest street (CS) mapping is performed based on the reported position data point and the partial map at stage 205. As will be described in further detail below, subsequent executions of stage 205 after MM is turned on at stage 211 and the map is updated at stage 221 may perform the CS mapping using a new reported position data point obtained from new GPS data or a new reported position data point obtained from new GPS data modified by an offset based on the map matching of a previous reported position data point as the starting point (i.e., the current vehicle location).

Figure 3:
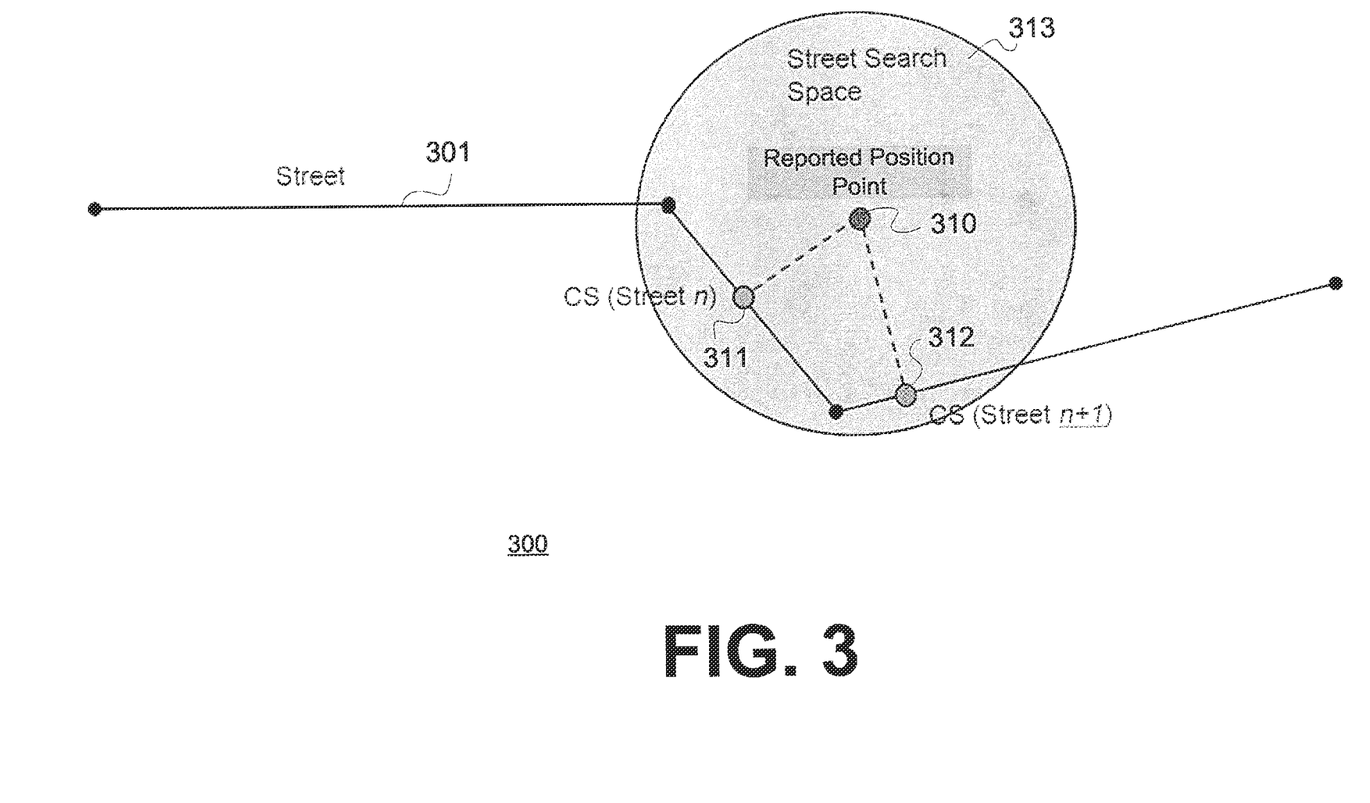
FIG. 3 is a diagram illustrating closest street estimation in accordance with an implementation of the described principles.

The CS mapping will be better understood with respect to the diagram 300 depicted in FIG. 3. The line segments corresponding to Street, Street n, and Street n+1 are part of a partial map 301. Point 310 is a reported position point obtained from the GPS data at stage 203. The street closest to point 310 is found by determining which street has the shortest perpendicular distance to point 310, which in FIG. 3, is Street n (i.e., the distance between points 310 and 311 is shorter than the distance between points 310 and 312). In a further implementation, searching for a closest street is limited to a predetermined radius around the reported position point 310, shown in FIG. 3 as the street search space 313. If no closest street can be found within the street search space 313, the MM application waits for updated GPS data that reports a position point 310 with a closest street on the partial map within the street search space 313, or alternatively determines that the vehicle has likely gone off-route, for example, if a closest street cannot be found within a predetermined time period or if the closest street is at least a certain distance apart from the reported position point.

After finding a closest street during the CS mapping at stage 205, a confidence value associated with the closest street is calculated ("CS confidence value"). The CS confidence value is inversely proportional to how close the reported position point is to its CS mapping (e.g., inversely proportional to the distance between points 310 and 311 in FIG. 3). An exemplary formula for the CS confidence value is K1*(1/[Shortest distance between reported position point and closest street]), where K1 is a constant.

If it is determined at stage 207 that map matching is not already turned on, the CS confidence value is compared with a threshold CS confidence value at stage 209. If the calculated CS confidence value is below the threshold CS confidence value, MM remains off and process 200 proceeds back to stage 203 where a new reported position point is acquired from GPS data. Alternatively, in a further implementation, the vehicle is determined to be off course, for example, if the CS confidence value is sufficiently low, or if the MM application has repeatedly been unable to pass the CS check at stage 209 for a predetermined amount of time (as measured by a timer) or a predetermined number of data points. It will be appreciated that at stage 209, instead of comparing the CS confidence value to a threshold CS confidence value, in another alternative implementation, the comparison can be between the perpendicular distance from the reported position point to the closest street and a threshold maximum distance (e.g., if it is below the threshold maximum distance, the CS check is passed).

The initial CS check at stage 209 ensures that the starting point for the map matching algorithm is sufficiently reliable. If the initial reported position data obtained from the GPS data is very far from the closest street of the initial map, it is likely that either the vehicle is off-route or the starting GPS data is too inaccurate for effective use of the MM algorithm.

Figure 4:
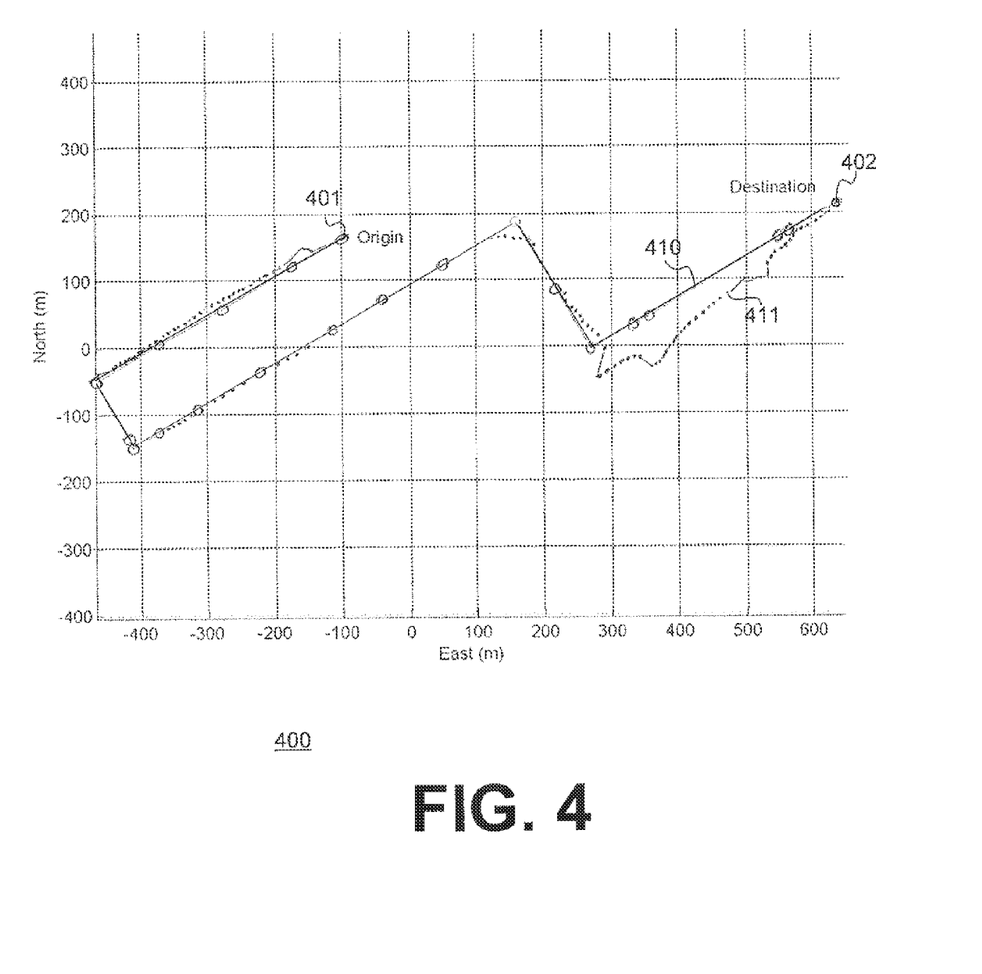
FIG. 4 is a diagram illustrating exemplary results of position estimation using map matching in accordance with an exemplary implementation of the described principles.
Figure 5:
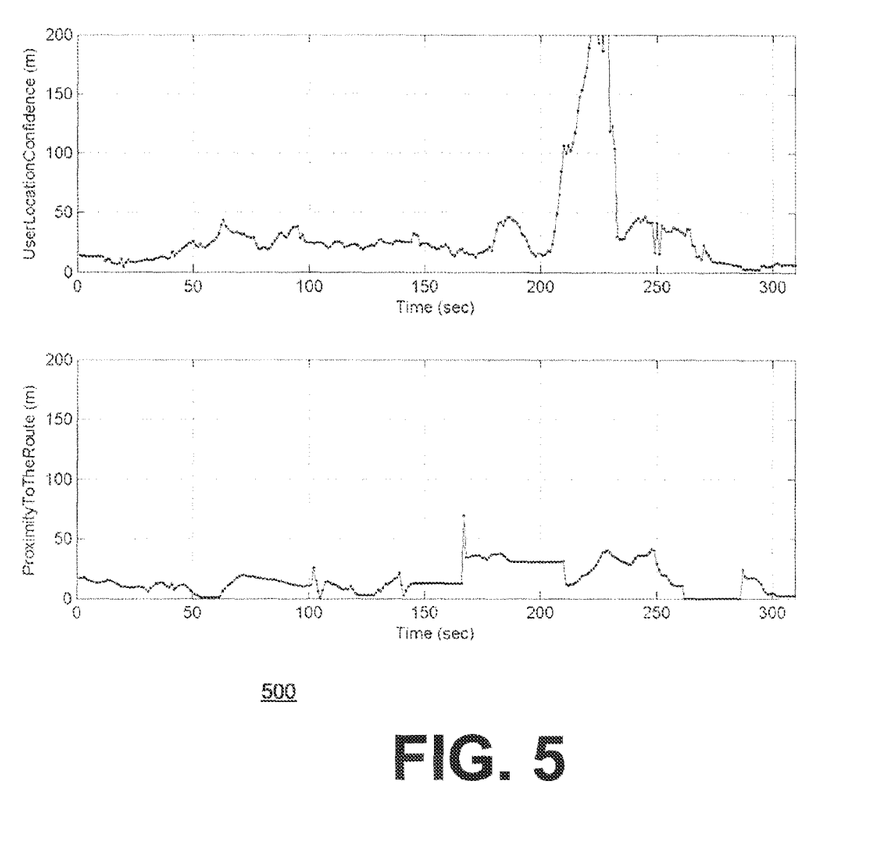
FIG. 5 is a graph illustrating exemplary parameters associated with position estimation using map matching in accordance with an exemplary implementation of the described principles.

Advantages of performing the CS mapping at stage 205 as described above are demonstrated by the experimental results shown in FIGS. 4 and 5. Conventional GPS/DR and GPS-only navigation systems generally include a UserLocationConfidence parameter that is transmitted together with positioning information to a GPS device such as the GPS component within a telematics unit. This UserLocationConfidence parameter indicates a confidence level determined by the GPS/DR or GPS-only navigation system associated with the positioning information it provides.

To give an example, a partial map from an origin 401 to a destination 402 is depicted by the line 410 in FIG. 4. Positioning information as measured by a GPS/DR device on a vehicle traveling along the path traced by the partial map is shown by the line 411 shown in FIG. 4. It will be appreciated that while the graph 400 is shown in an East-North coordinate system and GPS information typically relies on LatLon coordinates, one skilled in the art is readily able to implement conversions between such systems. Thus, GPS or GNSS systems utilizing LatLon or East-North coordinates may be used with a telematics unit that utilizes East-North or LatLon coordinates, respectively.

A comparison between the UserLocationConfidence parameter with the traveled path and a calculated ProximityToTheRoute parameter associated with the traveled path is depicted in the graphs 500 of FIG. 5. The ProximityToTheRoute parameter represents the perpendicular distance to the closest street as described above with respect to the CS mapping. As can be seen in the graphs 500, at around 200-250 seconds into the trip, the UserLocationConfidence spikes up to over 200 meters, while the ProximityToTheRoute provides a more useful metric of estimating a distance of at most about 40 meters away from the closest street. Therefore, utilizing a CS mapping as described above with respect to stage 205 provides a relatively more reliable way to estimate the position of a vehicle with respect to a partial map. It will be appreciated that higher values of UserLocationConfidence, which is measured in meters, indicates lower confidence in the reliability of positioning information, while the confidence values utilized by the present invention (CS, SS, and TD confidence values as described herein) are directly proportional to confidence in the accuracy of positioning information (higher values mean higher reliability).

In an alternative implementation of the CS check at stage 209 described above, the UserLocationConfidence parameter is used in combination with the CS confidence value (rather than only the CS confidence value being used). Thus, whether a CS mapping passes the CS check at stage 209 is based both on the UserLocationConfidence parameter indicating sufficient reliability (e.g., below a certain threshold number of meters) and on the CS confidence value indicating sufficient reliability (e.g., above a certain threshold CS confidence value). The criteria for pass the CS check at stage 209 may further be based on a sliding scale between the reliability associated with the UserLocationConfidence parameter and the CS confidence value.

Turning back to FIG. 2 and moving on in the process 200, if the CS check is passed at stage 209, MM is turned on and speed sum (SS) mapping begins at stage 211. SS mapping utilizes the selected CS mapping to propagate an SS mapping along the selected closest street based on subsequent speed readings. The subsequent speed readings are based on vehicle sensors and the SS mapping indicates the distance that the vehicle has traveled from a certain time, for example, since the GPS data was read at stage 203. In an alternative implementation, speed readings are acquired from the GPS data (e.g., the speed readings are included in the GPS data sent or calculated based on previous GPS data). Additionally, a speed confidence value is obtained based on the quality of the speed data (e.g., the GPS data includes a speed confidence value attached to speed readings received from the GPS data). An SS confidence value is calculated based on the SS mapping that is proportional to the sum of previous CS confidence values and the sum of previous speed confidence values. An exemplary formula for the SS confidence value is K2*[Sum of all previous CS confidence values]+K3*[Sum of all previous speed confidence values], where K2 and K3 are constants having iterative modifications (i.e., K2 and K3 for a second data point will not be the same as K2 and K3 for a first data point).

The CS confidence value and the SS confidence value are added together and compared with a minimum MM update threshold at stage 219. If the sum of the confidence values is above the threshold, the vehicle location is updated based on the CS mapping and the SS mapping and displayed to the user (e.g., through the vehicle HMI) at stage 221. For example, if the originally reported position data point is determined by the CS mapping to be five meters northeast of the closest street, the vehicle location may be updated by shifting the reported vehicle location five meters southwest so that it is on the closest street and then accounting for the distance traveled on that street since the time at which that data point was obtained using the SS mapping. If the sum of the confidence values is not above the threshold at stage 219, the vehicle location is not updated based on the CS mapping and the SS mapping because it does not meet the minimum requirements of reliability.

Whether or not the vehicle location is updated, the process 200 returns to stage 203 and obtains a new reported position data point from GPS data. It then performs a CS mapping at stage 205 with the new reported data point. In a further implementation, if a previous position data point was shifted at stage 221 based on a previous CS mapping and SS mapping, the new position data point can be preemptively shifted based on the shift applied to the previous data point, for example, in situations where the new position data point is obtained shortly after the previous position data point that was adjusted. Preemptively applying the previous shift is likely to provide a better starting point for the CS mapping and increase the CS confidence value associated with the CS mapping.

After performing the CS mapping and calculating a CS confidence value at stage 205, the process 200 proceeds to an off-route check at stage 213 pursuant to stage 207 since MM is on (it was set to on as described previously at stage 211). It will be appreciated that this off-route check at stage 213 need not be performed in this order and can be performed at another time within the process 200. The off-route check at stage 213 includes determining whether the CS confidence value associated with the CS mapping at stage 205 is above the threshold CS confidence value. If it is not above the threshold CS confidence value, a timer is started. The process 200 continues and the timer continues to increment until a subsequent off-route check at stage 213 determines that a CS confidence value is above the threshold CS confidence value, at which point the timer is stopped and reset. If that does not happen and the timer continues to increment until it reaches a predetermined amount of time, the vehicle is determined to be off-route or the position information is determined to be unreliable and MM is turned off. In one implementation, the process 200 goes back to stage 203 with MM off upon determining that the vehicle is off-route or that the position information is unreliable. In another implementation, once it is determined that the vehicle is off route or that the position information is unreliable, the process 200 is stopped until a route is recalculated and a new partial map is received, beginning the process 200 anew from stage 201.

If the vehicle passes the off-route check at stage 213 (i.e., the timer has not reached the predetermined amount of time), the process 200 proceeds to stage 215 where the SS mapping is updated with additional vehicle speed information (as described above with respect to the SS mapping at stage 211) and a new SS confidence value is calculated. Then, at stage 217, turn detection (TD) is performed and a TD confidence value is calculated. In an implementation, turn detection is performed in one or both of two ways: (1) the difference between a vehicle heading at two points in time is compared to a difference between street headings (e.g., a previously buffered vehicle heading from five seconds ago is compared with a currently buffered vehicle heading, and the difference in vehicle headings is compared with the difference in street directions at those two points in time); and (2) a pattern match is performed between vehicle distance and heading, and street distance and heading (i.e., the pattern of vehicle headings as a function of distance is compared to the pattern of street headings as a function of distance).

Thus, for example, if a vehicle is at point A at time X, and makes a 90 degree turn before getting to point B at time Y, the vehicle heading at point A and time X is 90 degrees off from the vehicle heading at point B at time Y. If this also corresponds to a 90 degree difference in the street headings of the streets of the partial map at points A and B (which are the estimated vehicle location points at times X and Y), a high TD confidence value is achieved. This also applies to the distance based calculation: for example, if a vehicle at a first distance traveled (from some reference point such as the beginning of a street segment, the origin, a previously updated location point, etc.) has a different heading than at a second distance traveled, the difference in the street headings corresponding to those two distances measured from the reference point can be compared to the difference in the vehicle headings. In a further implementation, the calculation of the confidence value is weighted by the difference in street headings (e.g., since the change in heading on a straight street is 0 degrees, no turn needs to be detected and the ID confidence value would be zero).

An exemplary formula for calculating a TD confidence value is: (1/[Difference between vehicle heading difference and street heading difference at two different times])*Street Heading Difference*K4+(1/[Difference between vehicle heading difference and street heading difference at two or more distances])*Street Heading Difference*K5. Because the TD confidence value is inversely proportional to the difference between the vehicle heading difference and street heading difference, there would be potential for division by zero in the formula when the differences are the same. This issue can readily addressed by one skilled in the art, for example, by assigning a maximum value to substitute for the (1/[x]) expressions when the (1/[x]) expressions would exceed the maximum value or have an undefined result.

Thus, according to this exemplary formula, both the time-based and pattern-based methods of turn detection are used, and the confidence value is weighted by the street heading difference. However, in an alternative implementation, the formula can be adjusted such that detecting a difference in vehicle heading when there is no difference in street heading results in a negative value, lowering the overall sum of the confidence values since the vehicle was determined to have made a change in heading When the vehicle was supposed to have been driving straight.

After calculating a TD confidence value at stage 217, the process 200 proceeds to stage 219, and the sum of the CS confidence value, the SS confidence value, and ID confidence value are added together and compared with the minimum MM update threshold. If the sum of the confidence values is above the minimum MM update threshold, the process 200 proceeds to stage 221 to update the vehicle location based on the CS and SS mappings and returns to stage 203 to obtain more GPS data as described above. If the sum of the confidence values is not above the minimum MM update threshold, the process 200 returns to stage 203 as discussed above.

It will be appreciated that all constants referenced in the formulas herein (K1, K2, K3, K4, and K5) may be dynamically set or pre-loaded based on the situation. For example, one set of constants is better adapted for a dense, urban canyon environment and another set of constants is better adapted for a spread-out, open sky environment. It will further be appreciated that the values assigned to the constants is a matter of design choice based on the degree of confidence desired for a particular navigation application, and the values of the constants can be experimentally fine-tuned. These principles also apply to the threshold values (e.g., confidence thresholds and amount of time thresholds) referred to in stages 209, 213, and 219. For example, the minimum CS confidence value needed to turn MM on in a rural area can be lower than the minimum CS confidence value needed to turn MM on in an urban area.

In summary, with respect to process 200 depicted by FIG. 2, map matching is not turned on until after a CS mapping is found to have a sufficiently high confidence level at stage 209. Once MM is turned on, SS mapping and turn detection is performed for each new data point that is acquired at stage 203. If the combined CS, SS, and TD confidence values are greater than a minimum MM update threshold, the map is updated with a calculated position point based on the CS mapping, SS mapping, and turn detection. Retrieving new position data points and updating the map based on the map matching algorithm is repeated while the user travels along the path of the partial map, but if the user goes off-route, MM is turned off until the user returns to the partial map or until a new partial map is provided to the telematics unit and a CS check at stage 209 is passed with respect to the new partial map.

It will thus be appreciated that the described system and method allows for reliable vehicle location estimation using map matching. It will also be appreciated, however, that the foregoing methods and implementations are merely examples of the inventive principles, and that these illustrate only preferred techniques.

It is thus contemplated that other implementations of the invention may differ in detail from foregoing examples. As such, all references to the invention are intended to reference the particular example of the invention being discussed at that point in the description and are not intended to imply any limitation as to the scope of the invention more generally. All language of distinction and disparagement with respect to certain features is intended to indicate a lack of preference for those features, but not to exclude such from the scope of the invention entirely unless otherwise indicated.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for estimating the position of a telematics-equipped vehicle during navigation, the method comprising:
   receiving, by a telematics unit, a partial map corresponding to a route, the partial map corresponding only to street segments to be traversed on the route;
   determining, by the telematics unit, an initial position of the vehicle based on satellite positioning data;
   calculating, by the telematics unit, a distance between the initial position of the vehicle and a point of a closest street on the partial map and calculating a closest street (CS) confidence value based on the distance;
   comparing, by the telematics unit, the CS confidence value to a threshold CS confidence value and, in response to a result of the comparison, executing a map matching (MM) procedure, the MM procedure comprising:
      calculating a distance traveled by the vehicle since the initial position of the vehicle based on speed readings acquired from vehicle sensors;
      calculating a speed sum (SS) confidence value based on past speed quality values obtained from past satellite positioning data and past calculated CS confidence values; and
      comparing a combination of the CS confidence value and the SS confidence value to a MM update threshold value and, in response to a result of the comparison, determining a map-matched position on the partial map corresponding to the initial position and the distance traveled by the vehicle since the initial position; and
   causing, by the telematics unit, the map-matched position of the vehicle to be presented as an updated current position of the vehicle.

2. The method of claim 1, wherein the CS confidence value is inversely proportional to the calculated distance between the initial position of the vehicle and a closest street on the partial map.

3. The method of claim 1, further comprising:
   comparing, at a later time, a later calculated CS confidence value to the threshold CS confidence value and, in response to a result of the comparison, starting a timer; and
   determining that the vehicle is off-route or that positioning information is unreliable in response to determining that the timer reaches a predetermined amount of time without any calculated CS confidence values being above the threshold CS confidence value during the predetermined amount of time.

4. The method of claim 1, further comprising:
   performing turn detection (TD) and calculating a TD confidence value based on a comparison between a difference in vehicle headings and a difference in street headings.

5. The method of claim 4, wherein performing TD further comprises at least one of:
   comparing a difference between vehicle headings at two distinct times with a difference in street headings at two distinct positions, wherein the two distinct positions correspond to estimated vehicle positions at the two distinct times; and
   comparing a difference between vehicle headings at two distinct distances from a reference point with a difference in street headings at the two distinct distances from the reference point.

6. The method of claim 4, wherein the combination of the CS confidence value and the SS confidence value further includes the TD confidence value.

7. A telematics unit having a non-transitory, computer-readable medium with computer-executable instructions for estimating the position of a telematics-equipped vehicle during navigation stored thereon, the computer-executable instructions, when executed by a processor, causing the telematics unit to perform the steps of:
   receiving a partial map corresponding to a route, the partial map corresponding only to street segments to be traversed on the route;
   determining an initial position of the vehicle based on satellite positioning data;
   calculating a distance between the initial position of the vehicle and a point of a closest street on the partial map and calculating a closest street (CS) confidence value based on the distance;
   comparing the CS confidence value to a threshold CS confidence value and, in response to a result of the comparison, executing a map matching (MM) procedure, the MM procedure comprising:
      calculating a distance traveled by the vehicle since the initial position of the vehicle based on speed readings acquired from vehicle sensors;
      calculating a speed sum (SS) confidence value based on past speed quality values obtained from past satellite positioning data and past calculated CS confidence values; and
      comparing a combination of the CS confidence value and the SS confidence value to a MM update threshold value and, in response to a result of the comparison, determining a map-matched position on the partial map corresponding to the initial position and the distance traveled by the vehicle since the initial position; and
   causing the map-matched position of the vehicle to be presented as an updated current position of the vehicle.

8. The telematics unit of claim 7, wherein the CS confidence value is inversely proportional to the calculated distance between the initial position of the vehicle and a closest street on the partial map.

9. The telematics unit of claim 7, wherein the computer-executable instructions, when executed by the processor, further cause the telematics unit to perform the steps of:
comparing, at a later time, a later calculated CS confidence value to the threshold CS confidence value and, in response to a result of the comparison, starting a timer; and
determining that the vehicle is off-route or that positioning information is unreliable in response to determining that the timer reaches a predetermined amount of time without any calculated CS confidence values being above the threshold CS confidence value during the predetermined amount of time.

10. The telematics unit of claim 7, wherein the computer-executable instructions, when executed by the processor, further cause the telematics unit to perform the steps of:
performing turn detection (TD) and calculating a TD confidence value based on a comparison between a difference in vehicle headings and a difference in street headings.

11. The telematics unit of claim 10, wherein performing TD further comprises at least one of:
comparing a difference between vehicle headings at two distinct times with a difference in street headings at two distinct positions, wherein the two distinct positions correspond to estimated vehicle positions at the two distinct times; and
comparing a difference between vehicle headings at two distinct distances from a reference point with a difference in street headings at the two distinct distances from the reference point.

12. The telematics unit of claim 10, wherein the combination of the CS confidence value and the SS confidence value further includes the TD confidence value.

* * * * *